March 22, 1927.

C. S. JOHNSTON

VEHICLE WHEEL

Filed March 22, 1920

Inventor
CLARENCE S. JOHNSTON
By Paul & Paul
His Attorneys.

March 22, 1927.
C. S. JOHNSTON
VEHICLE WHEEL
Filed March 22, 1920
1,621,932
2 Sheets-Sheet 2
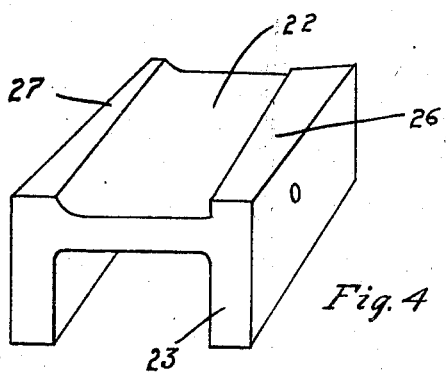
Fig. 4
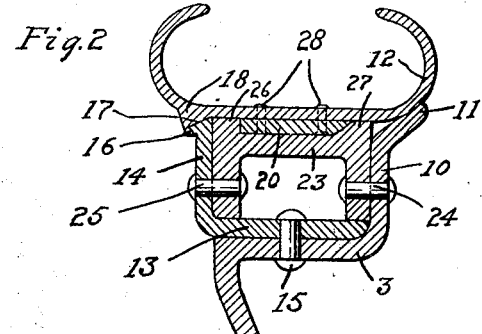
Fig. 2
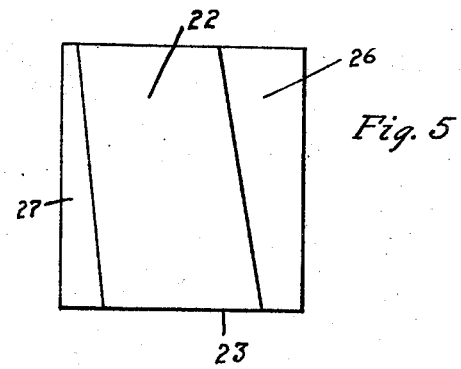
Fig. 5
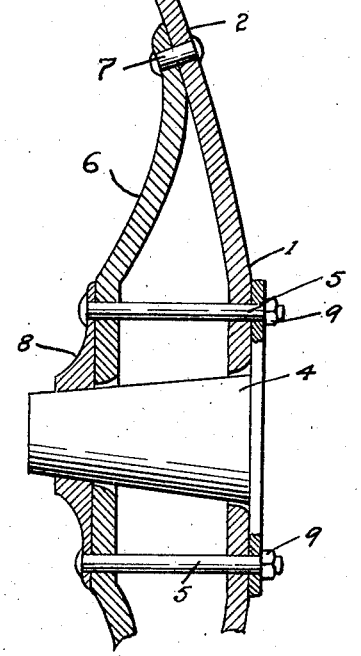
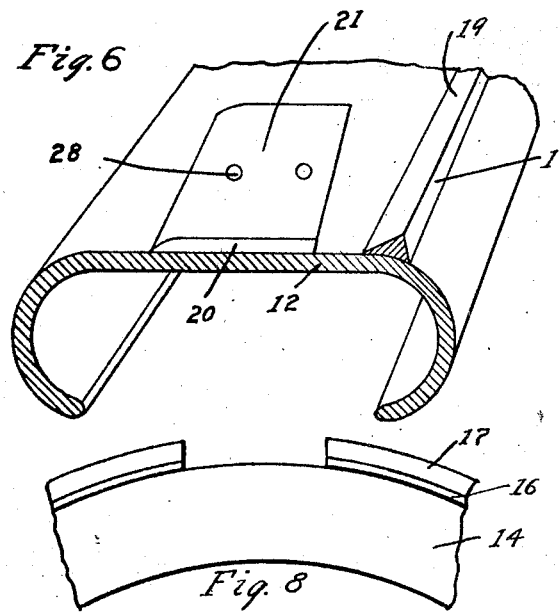
Fig. 6
Fig. 8
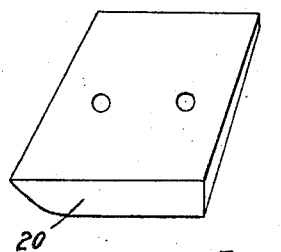
Fig. 7
Inventor
CLARENCE S. JOHNSTON
By Paul & Paul
His Attorneys.

Patented Mar. 22, 1927.

1,621,932

UNITED STATES PATENT OFFICE.

CLARENCE S. JOHNSTON, OF GLENDIVE, MONTANA, ASSIGNOR TO THE UNITED RIM COMPANY, OF MINNEAPOLIS, MINNESOTA, A CORPORATION OF MINNESOTA.

VEHICLE WHEEL.

Application filed March 22, 1920. Serial No. 367,812.

This invention relates to improvements in vehicle wheels of the type employing what are generally known as demountable rims. It provides a novel and improved construction in vehicle wheels and involves the employment of a fixed rim or wheel felly which is preferably of channeled construction in combination with means positioned in the channel to engage a demountable rim to hold the latter in secure, seated position on the felly. It further provides an improved construction in which the demountable rim may be easily mounted on the wheel and held in secure position thereon during use, and which may be readily released and easily demounted therefrom without disturbing the tire, usually pneumatic, which is secured to the rim. While this channeled felly construction may be employed on wooden wheels, it is preferably employed in conjunction with what are known commercially as disk wheels. These wheels are substantially metallic disks shaped to provide a hub portion (for the reception of the axle of the vehicle) and a rim portion (for the engagement of a demountable rim). In this new type, the rim portion provides a fixed rim or felly of what may be termed the channeled type. Mechanism, for moving the demountable rim into and out of locked seated position and for securing the demountable rim in locked position, is adapted to be interposed in the channeled felly, as are likewise the improved means for attaining this movement of the demountable rim into and out of locked position.

This novel wheel structure provides a locking engagement of demountable rim and felly which is broadly similar to that disclosed in the co-pending application of the inventor hereof, Serial No. 319,775, filed August 25, 1919 Patent 1,539,741, May 26, 1925. That engagement consists of means to lock the rim in frictional engagement with the felly by means of a transverse wedging movement of engaging surfaces on the rim and felly; and also a combination of this transverse engagement with the old radial locking engagement, shown in United States Letters Patent of the inventor hereof, No. 1,180,724, issued April 25, 1916.

The object of the invention, therefore, is to provide an improved vehicle wheel.

Another object is to provide an improved disk wheel in combination with an improved demountable rim.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

In the drawings:

Figure 2 is an enlarged sectional detail on the line 2—2 of Figure 1;

Figure 4 is an enlarged perspective of the block;

Figure 5 is a plan view of the block;

Figure 6 is a perspective view of a section of the demountable rim;

Figure 7 is a perspective view of the rim lug; and

Figure 8 is a detail of the felly, showing a flange portion as cut away.

Figure 1:
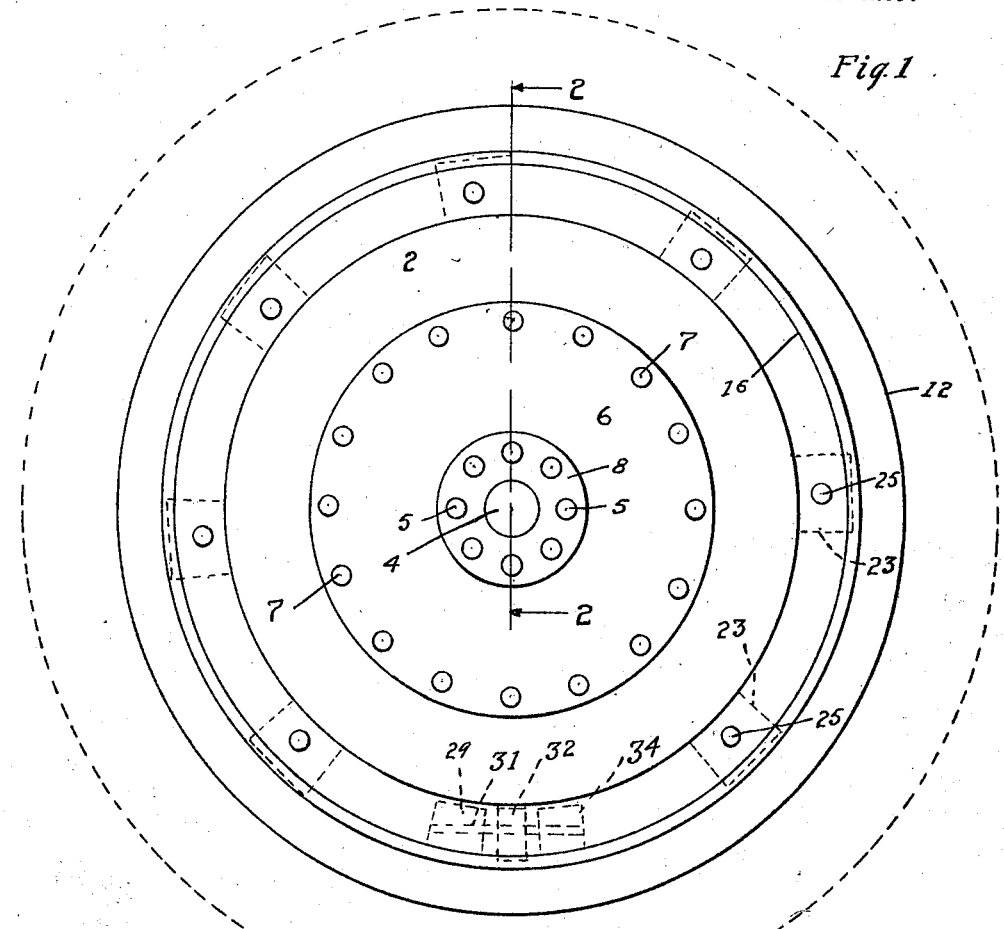
Figure 1 is a view in elevation of a wheel having the novel demountable rim secured thereto.

In the selected embodiment of this invention which is here shown for the purpose of disclosure of the invention, there is provided a disk vehicle wheel having a hub portion 1, a body portion 2 and a rim portion 3. The body portion of the disk wheel, which extends from the rim portion 3 to the hub portion 1, is preferably dished in accordance with standard practice. This wheel is shown as dished whereby the body portion 2 crosses the plane of impact of the wheel, the hub portion being joined to the hub 4 of the wheel by means of a plurality of bolts 5. A complementary hub portion 6 is provided on the body portion 2 and is annularly secured to the body portion by means of the rivets 7 and to the wheel hub 4 by the bolts 5. An annular cap 8 is preferably secured to the complementary portion 6 by means of the same bolts 5 held in locked position by means of the nuts 9 which engage the threaded ends of the bolts 5 as they project through the annular portion of the hub 4.

The integral rim portion is provided with means to afford opposed seats for the demountable rim. In this preferred form of the invention, the integral rim portion of the disk is provided with an element to form an annular seat for one side of the demountable rim, while a complementary member is secured to the rim portion and bears an annular seat for the other side of the demountable rim. In the specific embodiment here shown, the disk is turned substantially parallel to the axis of the wheel to form the integral rim portion 3. The integral rim portion 3 is further provided with an annular extension 10 which is turned in the direction of the radius of the wheel. This extension 10 forms one annular wall of the channeled felly. The terminal portion of this extension integral with the disk is preferably provided with an outwardly turned or flared flange 11 to form, as stated, an annular seat for one side of the demountable rim 12. An annular seat is also provided for the other side of the demountable rim. For this purpose an annular complementary member which is of angular cross-section is provided. Such complementary member consists of an annular base 13 and an annular wall 14. The base 13 is preferably positioned against and secured to the rim portion 3 as by means of rivets 15. The terminal portion of the wall 14 is preferably provided with a flange 16 which annularly and outwardly projects from the wall 14 substantially in the direction of the axis of the wheel. The outer peripheral face 17 of this flange 16 is preferably outwardly inclined as shown to afford an inclined seat for the annular abutment 18 (see Figure 6) formed on the under face of the demountable rim. The engaging face 19 of the abutment 18 of the demountable rim is also inclined, but its inclination is the reverse of that of the face 17 of the flange 16. This aids in placing the demountable rim in position on its seats and results in a more secure seating of the positioned demountable rim. The annular channel of the felly of this disk wheel is thus formed by the annular extension 10 of the disk and by the wall 14 of the complementary member.

This novel wheel construction also provides means for securing or locking the demountable rim in seated position on the wheel and for releasing the rim therefrom, through relative movement of the demountable rim and wheel felly. This consists in the provision of inter-engaging or cooperating securing means on the demountable rim and felly and of means for moving the rim relatively to the felly.

This securing or locking means is a frictional one obtained through the wedging action of members carried on the demountable rim and on the felly, which co-act radially and transversely to secure the rim to the wheel body in locked, wedged or frictional engagement when the rim is moved relatively to the wheel body.

As in the previous and pending application of the inventor hereof, to which reference has heretofore been made, in referring to the movements of the rim with relation to the wheel body, three directions or movements may be considered: The circumferential movement of the rim, i. e. when the rim is revolved on the periphery of the wheel body about the axis of the wheel; the radial movement of the demountable rim, i. e. when any point on the rim is moved to a greater or less radial distance from the hub or center of the wheel; and the transverse movement of the rim, i. e. when the rim is moved in either direction of the axis of the hub of the wheel.

In the embodiment of this invention selected for purposes of disclosure, the demountable rim and wheel felly are provided with interchangeable lugs which are oppositely presented when the rim is moved to seated position on the felly. The preferred form of lug formed on or secured to the inner face of the rim is shown in Figure 7. A plurality of these lugs 20 are annularly provided on the inner or concaved surface of the rim 12. The working surface 21 of each of these lugs is adapted to co-act with a complementary co-operable surface presented by the wheel felly. This co-operable surface is preferably provided by means secured to the wall 14 of the complementary member and to the extension 10 of the disk element. As here disclosed this means is shown in the form of what are termed blocks 23. A plurality of these blocks 23 are secured within the channel of the felly at spaced intervals around the circumference thereof. In the embodiment here shown, these blocks are substantially U-shaped in cross-section and are invertedly positioned in the felly channel. Rivets 24 pass through one side of the block and are also secured to the adjacent portion of the annular extension 10 of the disk, while the rivets 25 pass through the other side or leg of the block and are secured to the adjacent portion of the annular wall 14 of the complementary channel-forming member. These blocks are preferably longer than they are wide, i. e., are substantially oblong, and, as they are all alike, it will be necessary to describe but one. Likewise the lugs 20 are all alike and as each co-operates with a single block at a time, it will be necessary to describe the co-operating functions of but one block and lug in order to disclose the functions of each co-operable pair.

The co-operating surface 22 of each block is recessed and shaped to provide a wedging or camming surface for a lug 20. As shown in Figures 4 and 5, the longitudinally median line of the surface 22 is inclined at an acute angle to the longitudinally median line of the block 23. This provides a relatively wide abutment 26 on one side of the median line and a relatively narrower abutment 27 on the other side thereof. The inner face of the abutment 26 preferably meets the surface 22 in substantially a right-angle, while the surface 22 on the opposite side arcuately curves to join the upper face of the abutment 27. The working surface 21 of the lug 20 is shaped to correspond with the surface 22 of the block 23, as shown in Figure 6 and the lug 20 is secured to the demountable rim 12 by the rivets 28 so that its median line as shown in Figure 6 is inclined to the circumferential median line of the demountable rim. The operative engagement of one of these lugs and a block is shown in the cross-sectional view through a locked seated rim in Figure 2. Further, the working surface 22 of each block is slightly inclined to the plane of the surfaces of the abutments 26 and 27. The lug 20 is thinner at one end than at the other; in other words, the lug 20 is so formed that its working surface 21 is inclined or substantially tangential to the surface of the demountable rim. The relation of the inclination of the surface 21 of the lug and the surface 22 of the block is a reversed relation. Hence, when the demountable rim is seated on its felly seats, and is moved circumferentially by certain later described means, these interengaging surfaces, lug and block, co-act to force the rim radially—resulting in a locked secure seating of the rim on the wheel felly as the rim is susceptible of only a slight radial expansion.

Not only do these pairs of complementary lugs and blocks co-act, upon circumferential movement of the rim relatively to the wheel felly, to move the rim radially, but they also function to impart a slight transverse or axial movement of the rim. This is effected by the forming of the recessed surface 22 of each block so that its median line is inclined to the circumferential median line of the wheel felly. Therefore, as each lug 20 enters a recessed block 23, the series of lugs 20 (and therefore the rim) is forced slightly axially or transversely to secure a transversely wedging and frictional locking engagement of the demountable rim and wheel.

As shown in Figure 8 the annular flange 16 carried by the wall 14 of the complementary member is cut away at places intermediate each pair of blocks 23 in order that the demountable rim may be moved axially of the wheel toward seated position. If the flange 16 were not cut away at these points, the several lugs 20 carried by the rim interior would engage the flange and prevent the placement of the demountable rim upon the felly.

Figure 3:
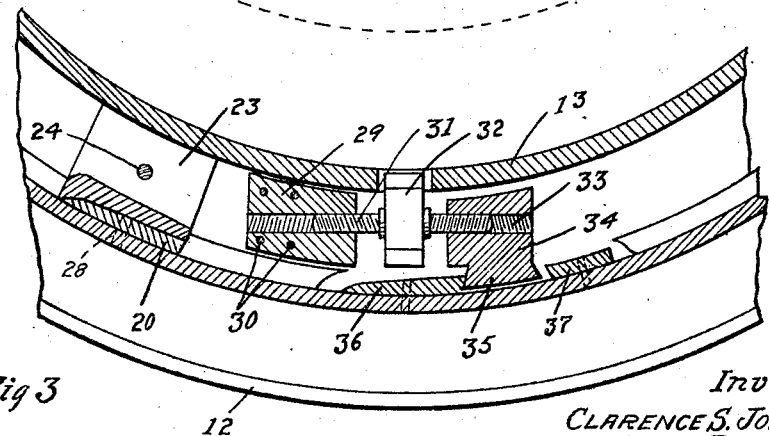
Figure 3 is an enlarged sectional detail of the mechanism for moving the rim relatively to the disk wheel body.

As heretofore stated, the rim is adapted to be moved circumferentially of the felly. This is the function of the means shown in detail in Figure 3. This means is broadly similar to that shown in the above-mentioned co-pending application. This rim-moving mechanism is carried, as before, in the channel of the felly which affords protection to the parts of the mechanism in their position adjacent the wheel periphery where they would otherwise be exposed to water, mud, stones and similar objects when the wheel is in use. A stationary block 29 is preferably secured to one wall of the felly channel, as by rivets 30. This stationary block is apertured to receive one end portion of a drive-screw 31 which is rotatable in this block but not movable axially therein. A nut 32 is made fast on the drive screw and prevents axial movement of the drive-screw by contacting with the adjacent faces of the base 13 of the complementary member of the felly structure. The other end portion of the drive-screw 31 is received in threaded engagement within a recess 33 formed in a movable block 34. This movable block 34 is substantially oblong and is positioned within the felly channel and is of such size with relation to the channel that rotation of this block is thereby prevented. Hence, as the nut 32 is rotated by means of a suitable wrench or other instrument, the movable block 34 will advance and retreat from the nut. Any movement of the block 34 is communicated to the demountable rim by means of an extension 35 integral with the movable block. This extension is adapted alternately to engage either one of two rim plates secured to the demountable rim and spaced apart a distance but slightly greater than the width of the extension 35. The plate 36 is adapted to be engaged by the extension 35 when the rim is moved circumferentially toward locked position, and, upon turning of the nut 32 in the opposite direction, the extension will engage the plate 37 to move the rim in the opposite direction with relation to the wheel felly. While the above mechanism is disclosed in this application, it is obvious that the mechanism for securing this relative movement of rim and felly disclosed in the application above referred to, which has since matured in Patent No. 1,539,741, dated May 26, 1925, or that shown in the above-mentioned patent of the inventor hereof may be used instead.

Having thus described my invention, what I claim as new and desire to secure by Letters Patent, is:

A vehicle wheel comprising a fixed channeled rim the side walls whereof are formed with seats for a demountable rim, a demountable rim, a substantially inverted U-shaped block fitted within the channel of the rim and having one surface formed with a recess extending at an angle to the longitudinal median line of the block and having an inclined base, one wall of the recess being substantially at a right angle to the base and the other wall curved, and a locking lug secured to the demountable rim and shaped conformably to the recess in the block secured to the other rim.

In witness whereof, I have hereunto set my hand this 3rd day of March 1920.

CLARENCE S. JOHNSTON.